United States Patent [19]
Dobson

[11] 3,736,730
[45] June 5, 1973

[54] APPARATUS FOR REMOVING TASSELS

[76] Inventor: Ora B. Dobson, Ralston, Iowa

[22] Filed: Feb. 24, 1972

[21] Appl. No.: 229,047

[52] U.S. Cl.............................................56/63, 171/58
[51] Int. Cl..............................................A01d 45/02
[58] Field of Search..................56/51, 56, 63, 13.5; 171/58

[56] References Cited

UNITED STATES PATENTS

| 3,127,724 | 4/1964 | Fraresso et al. | 171/58 X |
| 3,036,419 | 5/1962 | Magnuson et al. | 171/58 X |
| 2,163,849 | 6/1939 | Pfister | 56/51 X |

*Primary Examiner*—Louis G. Mancene
*Assistant Examiner*—J. N. Eskovitz
*Attorney*—H. Robert Henderson, Louis J. Strom, Glenn H. Antrim and Richard W. Collins

[57] ABSTRACT

Apparatus for removing tassels from plant stalks is disclosed herein. The apparatus includes a pair of wheels mounted on a framework at an angle one to the other with an area of contact between portions of the two wheels. One of the wheels is rotated by suitable power means and the other wheel preferably is rotated by frictional contact with the rotated wheel. The wheels are formed, in profile, in the shape of a frustum, and the area of contact between the wheels results from mounting the wheels such that the side surfaces of the frustums are adjacent one another at the rear of the apparatus.

The wheels preferably have a spring wire skeletal framework, and a resilient material forms at least the side surfaces of the wheel.

5 Claims, 9 Drawing Figures

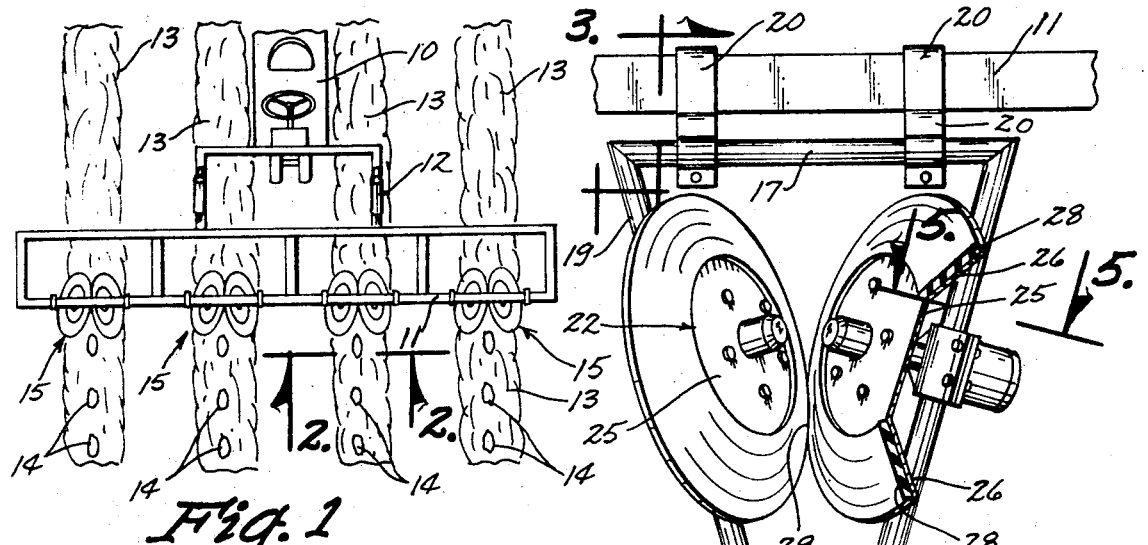
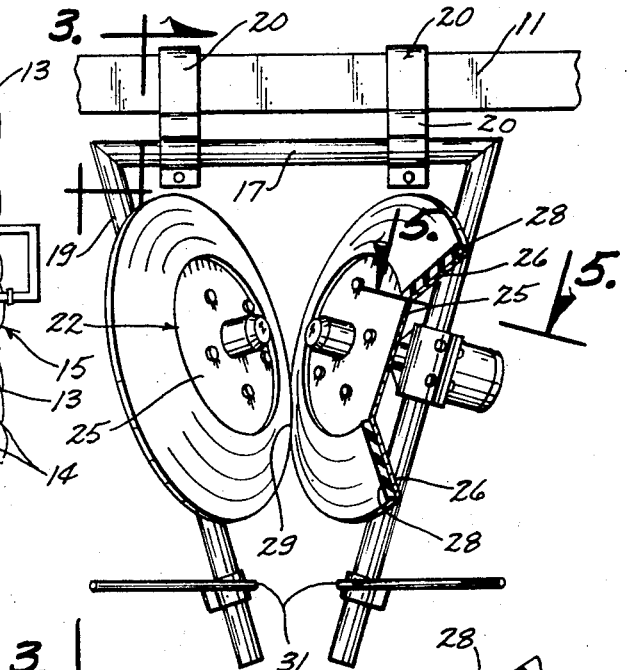
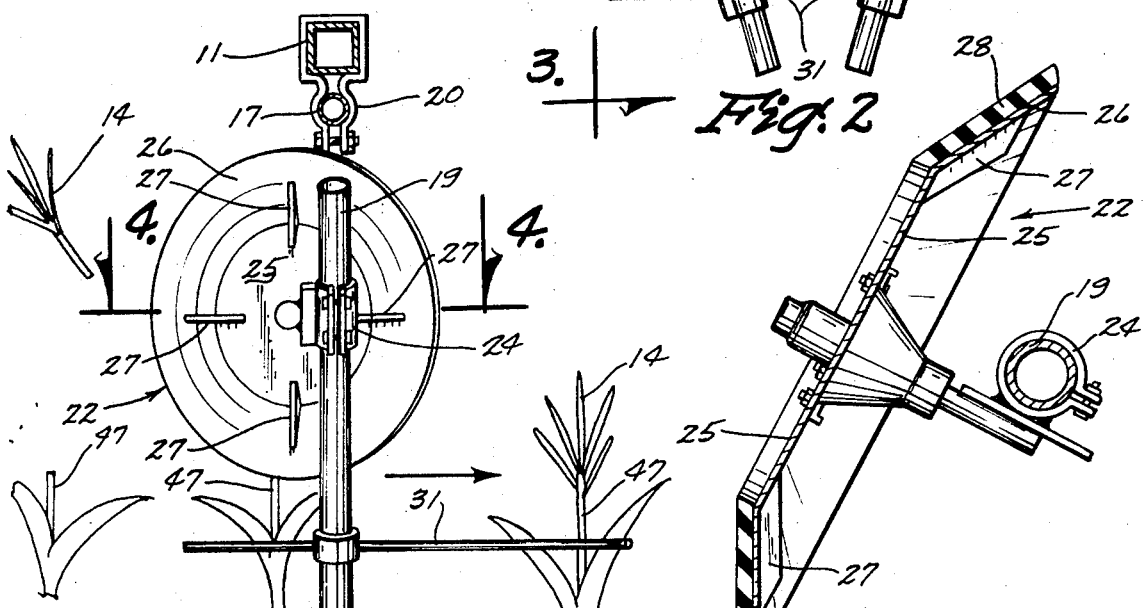
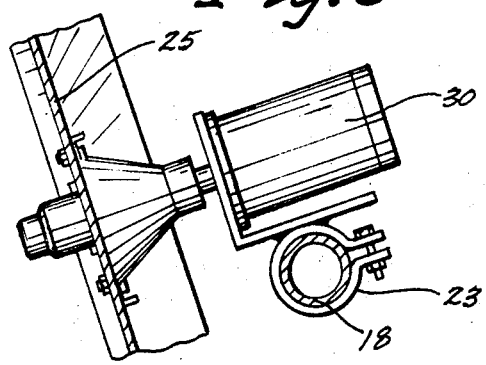

APPARATUS FOR REMOVING TASSELS

BACKGROUND OF THE INVENTION

It is a common practice in the hybrid seed corn industry to remove the tassels from selected rows of corn stalks in a seed corn field. The tassel removal desirably is done in a manner that removes most or all of the tassels and causes a minimum of plant damage.

The most common technique of detasseling corn has been hand removal, but in recent years various mechanized devices have been utilized. Examples of prior art mechanized tassel pulling equipment are described in U.S. Pat. Nos. 2,397,249 and 3,524,308. Another example of a tassel pulling device which is somewhat related to the present invention is described in U.S. Pat. No. 2,163,849. There is presently no device available which is effective enough in removing tassels that a follow-up hand pulling operation is not requided. In this regard, a removal effectiveness of 80–90 percent is considered quite good for a machine, but the removal of 99 percent or more of the selected tassels must be achieved for proper seed corn production, such that a follow-up hand removal will no doubt be necessary for the foreseeable future, at least.

The device described in U.S. Pat. No. 2,163,849 mentioned above includes a pair of wheels mounted at an angle one at the other, and relies on contact between pneumatic tires at the periphery of the wheels. A disadvantage to the use of pneumatic tires is that in order to get an adequate pulling surface the tires required are so large as to make the device unsuitable for use in fields where the rows are closely spaced one to the other.

There has been a need for a tassel pulling apparatus that is efficient, inexpensive, and useable in fields where the plant rows are very close to one another.

SUMMARY OF THE INVENTION

This invention relates to apparatus for removing tassels from plant stalks, and more specifically to a tassel pulling apparatus including a pair of rotatable members (wheels) mounted at an angle one to the other with a contacting surface area therebetween.

According to this invention, a tassel puller is provided which includes a framework attachable to the mounting bar of a typical high-clearance vehicle, and a pair of rotatable members are adjustably attached to the framework at an angle one to the other so as to form a forwardly facing V-shaped opening into which tassels are directed for removal from the plant stalks.

Power means are provided for rotating one of the rotatable members, and the other is rotated by frictional contact with the one. The rotatable members are formed in the configuration of a frustum, which as used herein is to be considered as that portion of a cone between its base and a plane parallel thereto intersecting the cone between its base and apex. The contacting side surfaces of the rotatable members are formed of a resilient material such as rubber to provide a good gripping action at the area of contact, and in some cases a spring wire skeletal framework is provided to define the shape of the rotatable members.

The rotatable members may also be formed as a casting or the like with a resilient material attached to the sides thereof.

By means of the adjustable mounting feature of the rotatable members to the framework, the height above ground and the angle between the rotatable members may be varied to suit the particular field conditions.

It is accordingly an object of this invention to provide an improved detasseling apparatus which is useable over a wide range of conditions.

BRIEF DESCRIPTION OF THE DRAWINGS

FIG. 1 is a top plan view of a vehicle having four of the devices of this invention mounted thereon.

FIG. 2 is a front elevational view, partially cut away, illustrating the device of this invention.

FIG. 3 is a side elevation taken along the line 3—3 of FIG. 2.

FIG. 4 is a cross section taken along the line 4—4 of FIG. 3.

FIG. 5 is a view taken along the line 5—5 of FIG. 2.

DESCRIPTION OF THE PREFERRED EMBODIMENTS

Figure 6:
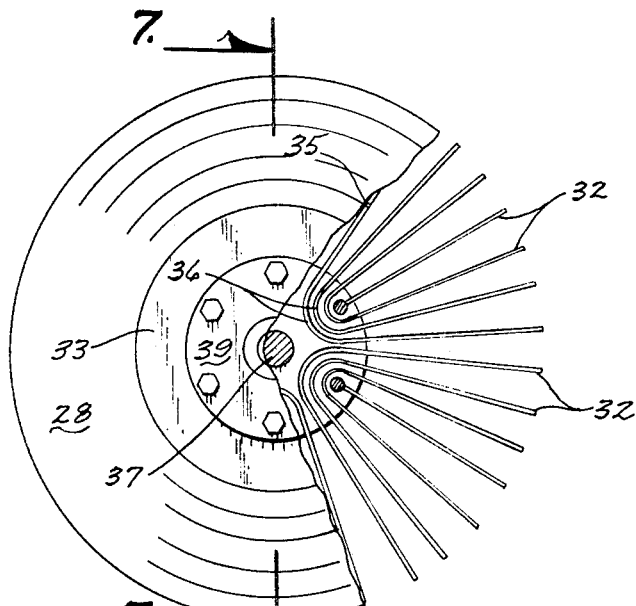
FIG. 6 is a full view, partially broken away, illustrating one embodiment of a wheel useable in the device of the invention.

A detailed description of a preferred embodiment of the device of this invention, including various forms of a wheel for use therewith, will now be given with reference to the several views of the drawings.

In FIG. 1 a vehicle 10 is shown having a mounting bar 11 which is adjustably connected to the vehicle by hydraulic means 12. Such vehicles including adjustable mounting bars are well known and constitute no part of the present invention. The vehicle 10 is shown traversing a field having rows 13 of plants having tassels 14 to be removed. Tassel pulling devices 15 are shown mounted on the mounting bar 11 of vehicle 10. Four tassel pulling devices 15 are illustrated in FIG. 1, but it should be understood that the number and spacing of tassel pulling devices 15 carried by a vehicle may vary according to specific requirements. Again, this invention is directed to an improved tassel pulling device, and not to the details of a hybrid seed corn operation.

A tassel pulling device 15 according to the preferred embodiment of the invention is illustrated in detail in FIGS. 2–5. As best seen in FIG. 2, a supporting frame 16 is clamped to the mounting bar 11 by clamps 20 attached to an upper horizontal member 17 of supporting frame 16 (FIGS. 2 and 3). Depending arms 18 and 19 of supporting frame 16 extend downwardly from opposite ends of horizontal member 17, and converge inwardly in the same plane as best seen in FIG. 2. A pair of rotatable members 21 and 22, which may be identical, are mounted one on each of depending arms 18 and 19 by clamps 23 and 24 respectively. The rotatable members 21 and 22 more precisely are journaled on shafts which in turn are affixed to suitable brackets attached to the clamps 23 and 24. The rotatable members 21 and 22 are mounted in a facing relationship at an angle one to the other as best seen in FIG. 2.

Figure 7:
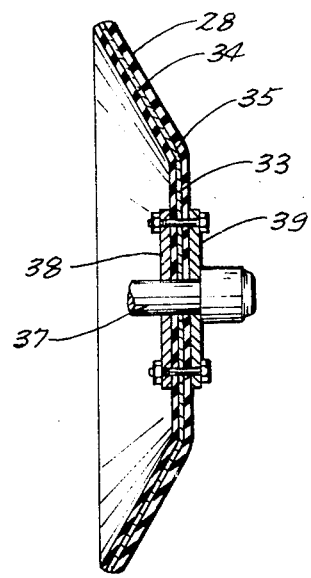
FIG. 7 is a cross section taken along the line 7—7 of FIG. 6.

The rotatable members 21 and 22 are formed with the configuration of a frustum, which as used herein means the section of a cone between its base and a plane parallel thereto intersecting the cone between the base and its apex. The configuration is best illustrated in FIGS. 4 and 7. Preferably the frustum is of a cone which is fairly large in diameter relative to its height for reasons to be explained below.

In the embodiment of FIGS. 2–5, the rotatable members include a supporting disc 25 having an outer frustum section 26. Gussets 27 are shown at the back of the members to provide structural strength. On the frustum section 26 of disc 25 a resilient cover 28, also in the configuration of a frustum, is bonded or otherwise attached. The rotatable members 21 and 22 are positioned on the supporting frame 16 such that the resilient covers 28 of members 21 and 22 contact one another (FIG. 2) to provide a tassel pulling interface 29. A power means 30, which may be a hydraulic motor connected to the hydraulic system of the carrying vehicle, is provided for driving rotatable member 21, and member 22 is driven by frictional contact between the covers 28 at interface 29. In this regard the operation is not unlike that of prior art tassel pulling devices which utilized pneumatic tires to provide a tassel pulling interface. However, by this invention, a larger interface can be obtained with smaller overall dimensions such that a tassel puller using rotatable members shaped as frustums can be used in fields having very close row spacing.

Guide fingers 31 (FIGS. 2 and 3) are adjustably located on arms 18 and 19 for guiding plants toward the tassel pulling interface 29 as is well understood in the art.

Alternative versions of rotatable members are illustrated in FIGS. 6 and 7 and FIGS. 8 and 9. In FIGS. 6 and 7, a series of spring wire spokes 32 radiate outwardly, and provide a skeletal framework including a flat central section 33 (FIG. 7) and an outer section 34 in the configuration of a frustum. The spokes are each bent as at 35 a uniform distance from the axis of the rotatable member to provide the desired shape. At least part of the spokes are provided as the leg portions of V-shaped members 36 spread at varying angles as shown in FIG. 6. The skeletal framework provided thereby may be covered with resilient material, such as by an appropriate molding operation, and then attached to shaft 37 by plates 38 and 39 as shown in FIG. 7.

Figure 8:
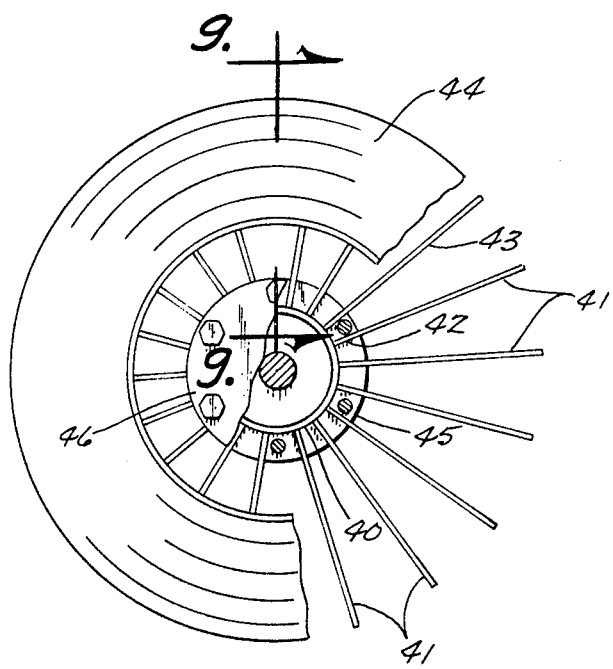
FIG. 8 is a full view, partially broken away, illustrating another embodiment of a wheel useable in the device of the invention.
Figure 9:
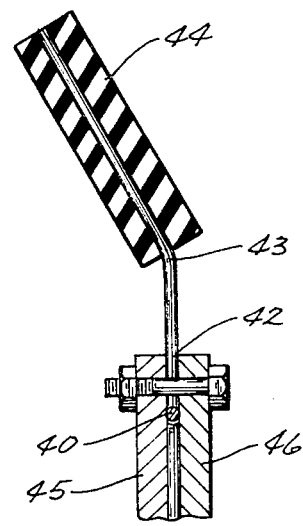
FIG. 9 is an enlarged cross section taken along line 9—9 of FIG. 8.

In FIGS. 8 and 9, an inner ring 40 has spokes 41 extending outwardly therefrom. The spokes 41 define an open central flat section 42 and are each bent as at 43 to provide an outer section 44 in the configuration of a frustum. The outer section of spokes 41 are encased in a suitable resilient material to provide a contacting and tassel pulling section 44. The rotatable member of FIG. 8 may be attached between plates 45 and 46 as shown in FIG. 9.

Additional variations and modifications for the rotatable members will be apparent, and in accordance with this invention the important aspects thereof will be the frustum configuration and the contacting surface on the outer extent thereof.

The operation of a tassel pulling device in accordance with this invention, while largely apparent from the above description of the structure of the device, will be briefly described.

One or more tassel pulling devices 15 are mounted to a typical high-clearance vehicle 11, and the vehicle is positioned in a field for movement along rows of plants to be detasseled. The power means 30 is activated to drive rotatable member 21, which in turn drives member 22 by frictional contact at interface 29. The tassel pulling device is adjusted for the average height of the plants to be detasseled, and then is propelled along a plant row as shown in FIGS. 1 and 3. Plant stalks 47 (FIG. 3) having tassels 14 are guided by guide fingers 31 toward the interface 29, and upon reaching the interface 29 the tassels 14 are removed and expelled upwardly and rearwardly of the device (FIG. 3). It will be apparent that by forming the rotatable members 21 and 22 in the configuration of a frustum, a maximum interface area is provided for a given overall size of tassel pulling device.

Modifications and variations of the preferred embodiments described above will be apparent which are within the scope of the invention, which is to be defined by the appended claims.

I claim:

1. A device for removing tassels from plant stalks comprising:

a supporting frame having an elongated horizontally disposed member for attachment to a mounting bar and having a pair of depending members extending downwardly from the horizontally disposed member, the depending members being in a common plane and converging inwardly from the horizontally disposed member;

a pair of rotatable members affixed one to each of the depending members of the supporting frame, each of said rotatable members including a contacting surface formed of a resilient material and conforming to the shape of the side of a frustum, the rotatable members being mounted at an angle with respect to one another with the contacting surface of each in a facing relationship with the other and in contact therewith at a portion thereof; and adjustable clamping means for attaching each of the rotatable members to a depending member.

2. The device of claim 1 wherein power rotating means is provided for one of the pair of rotatable members and the other of the pair of rotatable members is rotated by frictional contact with the one.

3. The device of claim 1 wherein the rotatable members include a skeletal framework defining the general configuration of the members, at least the outer sections of the skeletal framework being encased in the resilient material forming the contacting surfaces.

4. The device of claim 3 wherein the skeletal framework comprises a plurality of spring wire spokes extending radially outward, the spokes each having a bend a common distance from the central axis of the rotatable member, and the spokes being oriented such that the outer portions thereof define a skeletal frustum.

5. The device of claim 4 wherein at least a portion of the spokes are provided in pairs by V-shaped elements, the points of the V-shaped elements being attached to a rotatable member near the central axis thereof.

* * * * *